United States Patent [19]
Chopping et al.

[11] Patent Number: 5,579,311
[45] Date of Patent: Nov. 26, 1996

[54] TELECOMMUNICATIONS SWITCHING

[75] Inventors: Geoffrey Chopping; Thomas S. Maddern; Paul A. Smith, all of Dorset, United Kingdom

[73] Assignee: GPT Limited, United Kingdom

[21] Appl. No.: 302,513

[22] Filed: Sep. 8, 1994

[30] Foreign Application Priority Data

Sep. 21, 1993 [GB] United Kingdom ............... 9319449

[51] Int. Cl.$^6$ .................................. H04L 12/56; H04J 3/12
[52] U.S. Cl. ..................... 370/60.1; 370/68.1; 370/110.1
[58] Field of Search ................................ 370/58.1, 58.2, 370/58.3, 60, 60.1, 68.1, 110.1, 94.1, 94.2

[56] References Cited

U.S. PATENT DOCUMENTS

| | | |
|---|---|---|
| 4,615,028 | 9/1986 | Lewis et al. ............... 370/68.1 |
| 4,926,416 | 5/1990 | Weik ...................... 370/60.1 |
| 5,119,370 | 6/1992 | Terry ..................... 370/60.1 |
| 5,140,590 | 8/1992 | Gertsman et al. ............ 370/68.1 |
| 5,440,554 | 8/1995 | Stannard et al. ............ 370/68.1 |

*Primary Examiner*—Wellington Chin
*Attorney, Agent, or Firm*—Kirschstein, et al.

[57] ABSTRACT

In a telecommunications system in which narrowband or guiding services already exist, different service rates, either fixed or variable may be required. A further service switch is connected in parallel with the existing narrowband or guiding switch, the further service switch being similarly controlled in response to the guiding signalling.

17 Claims, 5 Drawing Sheets

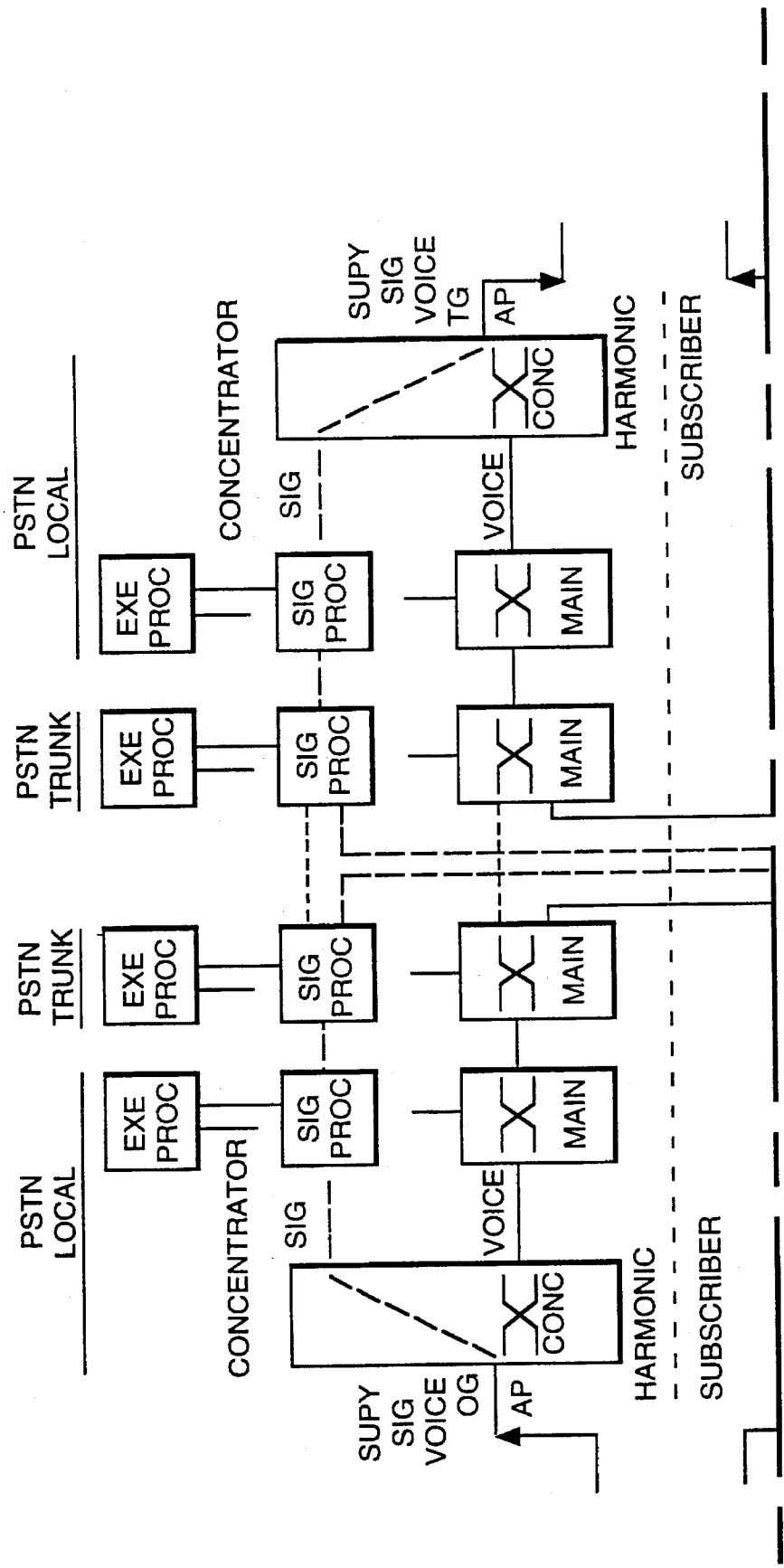

TELECOMMUNICATIONS SWITCHING

BACKGROUND OF THE INVENTION

Dial-up telecommunication services have been principally concerned with providing circuits between subscribers that are capable of carrying speech, with non-speech traffic being adapted so that it can be carried by the speech circuits. The many signalling protocols, call control and billing methods for the Public Switched Telephony Network (PSTN) have been evolved over many years and now offer a very considerable range of features and facilities. Some other dial-up networks have also been introduced, such as Telex and Packet Switching, which each have their own signalling protocols, call control and billing methods, which give their own features and facilities.

As new dial up services are proposed, either new signalling protocols, call control and billing methods must be introduced, or the existing ones re-used. The object of the present invention is to maximise the opportunity to re-use the existing PSTN signalling, call control and billing methods, thereby greatly reducing the development cycle as well as making it unnecessary to wait for new signalling protocols to be agreed by the standards organisations.

The underlying architecture of what is herein termed "harmonic switching" is suitable for controlling the many new proposed dial-up services, an example of which is Asynchronous Transfer Mode (ATM).

SUMMARY OF THE INVENTION

According to the present invention there is provided a telecommunications switching system having a first guiding transmission path and a second harmonic transmission path which is in parallel or harmony with the first guiding transmission path, comprising:

- an originating guiding access point on an exchange where the originating subscriber's guiding terminal is connected, the terminal having both supervisory and signalling means;
- an originating harmonic access point on an exchange where the originating subscriber's harmonic terminal is connected;
- a terminating guiding access point on an exchange where the terminating subscriber's guiding terminal is connected, the terminal having both supervisory and signalling means; and
- a terminating harmonic access point on an exchange where the terminating subscriber's harmonic terminal is connected; and
- switching means whereby to establish a harmonic call between the exchanges having harmonic access points; and
- means of establishing a guiding call having the guiding access points and passing through the exchanges having the harmonic access points.

BRIEF DESCRIPTION OF THE DRAWINGS

The present invention will now be described by way of example by reference to the accompanying drawings, in which.

DESCRIPTION OF A PREFERRED EMBODIMENT

It is assumed herein that guiding services already exist and that different service rates, either fixed or variable service rates, are required.

Figure 1:
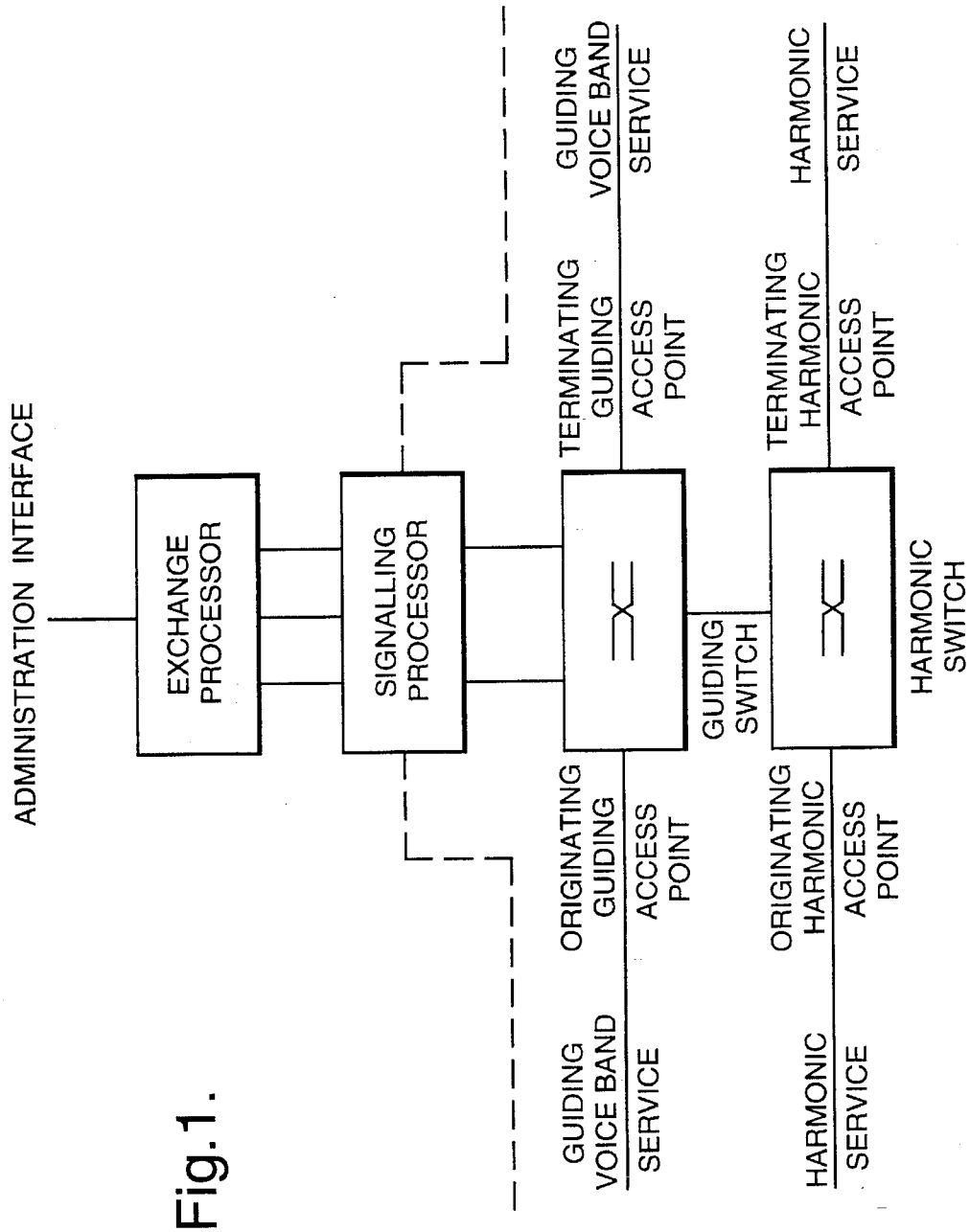
FIG. 1 shows a diagrammatic representation of a simple harmonic switching network arrangement.

The general method as shown in FIG. 1 consists of a parallel service switch, which works alongside a guiding switch, which in this example is an existing design of a 64 kbit/s narrowband switch. The existing signalling, call control and billing can be substantially the same provided they are mainly segregated from the switching in a separate signalling and control layer. In which case having two switching layers instead of one is a practical extension of a single switching layer architecture. Some existing telecommunication exchange architecture such as System X do maintain such segregation.

Adding a harmonic switch to every existing narrowband switch within a PSTN, as well as adding the extra inter-exchange transmission equipment, would be required if that PSTN was to be completely upgraded to harmonic switching.

It is also possible to extend this same principle to multiple parallel switching layers where the call routing was the same for all the layers and thus provide a method for establishing multimedia calls. The transmission path set up in the guiding network could be used as one of the media in a multimedia call.

Figure 2B:
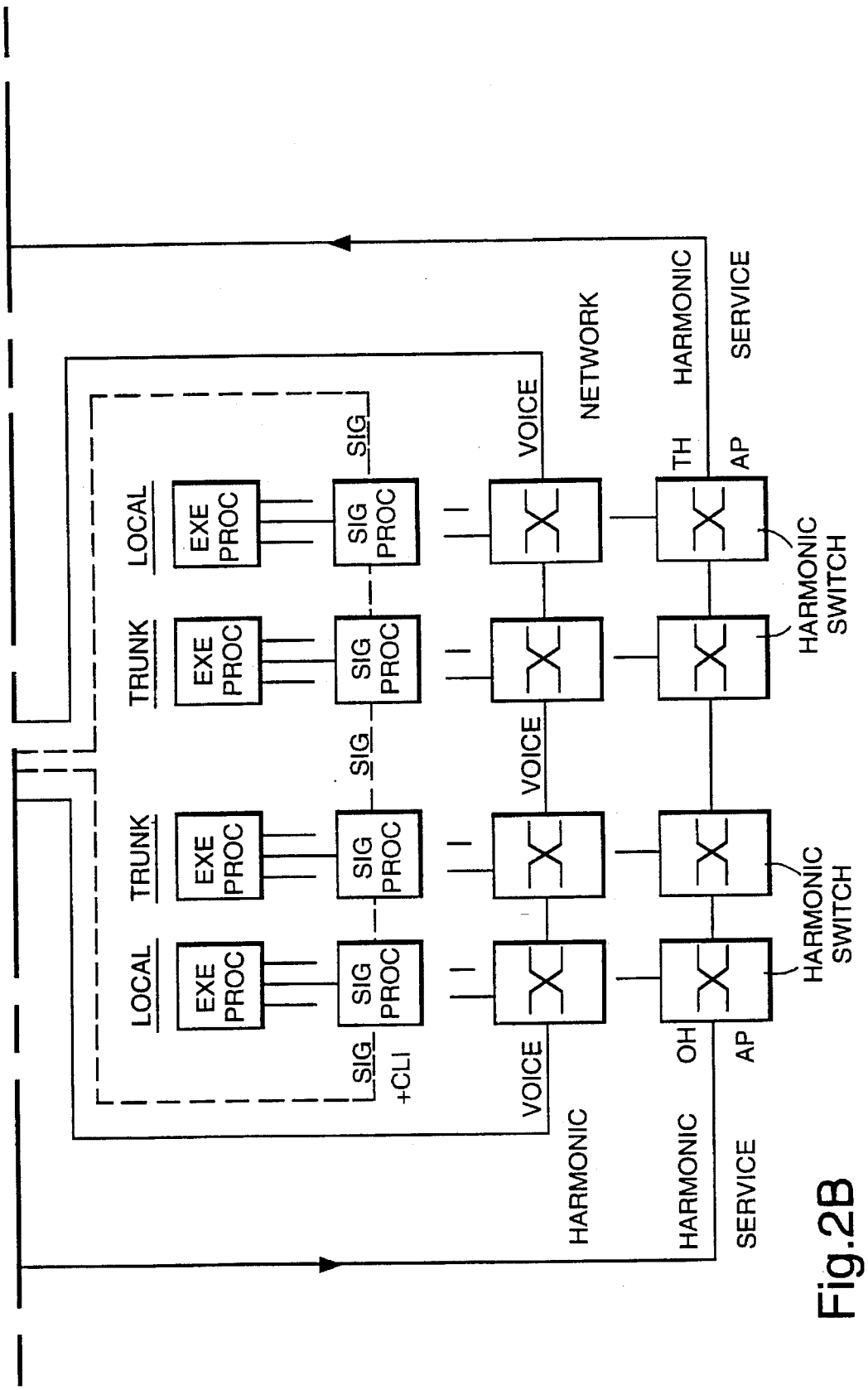
FIG. 2 shows a diagrammatic representation of a multiple exchange PSTN with an interconnected multiple exchange harmonic network.

FIG. 2 shows an overlay approach which is a commonly used method of adding new services. The overlay network corresponds to the general method of FIG. 1, but the guiding circuit is also carded, for some of its routing, by the existing PSTN.

The concept of harmonic switching is to marry two or more switching service rates to a single signalling and call control mechanism.

If the supervisory and signalling techniques used in the present PSTNs were completely independent of the delivery of the guiding circuit to the subscriber then the guiding circuit could be replaced by another type of circuit connection. In practice supervisory and signalling are directly related to the guiding circuity. For example: seizing by applying a resistance between the pair at the originating point; signalling by applying multi-frequency (MF) tones; ringing by applying a cadence of A.C. voltage across the pair; ring tone by applying a cadence of tones on the circuit at the far end exchange termination point of the circuit; as well as announcements and operator guidance being switched through on the guiding circuit. Unless suitable equivalents are provided by other means, it is easier to retain the existing guiding circuit arrangements and add the additional harmonic switching layer where necessary.

Where suitable signalling equivalents are provided, for example 64 kbit/s ISDN data calls, there is no need to establish the guiding circuit between the harmonic access points. In this case the control of the harmonic circuit via the ISDN can still be a considerable advantage.

Harmonic Switching is an extension of the principles used in earlier digital telecommunications where the signalling of the call is processed at the nodes that do the switching.

The concept of harmonic switching as illustrated in FIG. 1 can be applied to the public and private markets to provide other service rates, by adding suitable harmonic switching, which work in harmony with the signalling of the guiding path. A harmonic switch can be broadband, wideband, Synchronous Digital Hierarchy (SDH), ATM, N×64 kbit/s etc.

The concept can also be applied to an existing network of wideband switches which does not have call control, by adding a guiding network which does have call control, providing the two networks have a common harmonic topology.

There are four different access points, as shown in FIG. 2, for a single call:
  a. Originating Guiding Access Point (OGAP) The point at which the line to the originating subscriber's guiding terminal is terminated on an exchange.
  b. Originating Harmonic Access Point (OHAP) The point at which the line to the originating subscriber's harmonic terminal is terminated on an exchange.
  c. Terminating Guiding Access Point (TGAP) The point at which the line to the terminating subscriber's guiding terminal is terminated on an exchange.
  d. Terminating Harmonic Access Point (TttAP) The point at which the line to the terminating subscriber's harmonic terminal is terminated on an exchange.

The primary rule for harmonic switching is that the guiding call must pass through all the exchanges containing the above access points.

The secondary rule is that, within the exchanges where both the guiding and the harmonic paths are switched, the signalling and call control must be sufficiently segregated from the switching so that the existence of two paths does not affect the normal guiding signalling protocols.

As can be seen in FIG. 2, where the terminating guiding local exchange is not the same exchange as the terminating harmonic exchange, the route to the terminating guiding local exchange is immaterial. Similarly the route from the originating guiding local exchange to the originating harmonic exchange is not important except that the Calling Line Identity (CLI) must be supplied to the originating harmonic exchange. CLI has to be supplied so that the originating harmonic exchange can link the guiding path with the correct harmonic termination. Apart from the requirement to be able to supply CLI the non harmonic exchanges can be existing ordinary PSTN exchanges. Alternatively if the existing ordinary PSTN exchanges cannot supply CLI, other mechanisms can be used to supply the originating identity such as additional MF digits sent by the originating guiding subscriber, once the guiding circuit has been established as far as the originating harmonic exchange. All references to CLI herein can be achieved by the use of such alternative techniques.

The advantages of harmonic switching are:
  a. It allows existing subscriber signalling and network signalling methods to be used, without waiting for new standards to be agreed.
  b. It enables new services to be quickly provided.
  c. Few additions have to be made to call control to enable harmonic services to be offered. These are: to set up the switch paths in parallel provided neither of the paths through the switches are blocked; to clear down both paths and; to make sure that if one of the paths fails the whole call is cleared down, in all exchanges used for that path, in a controlled way.
  d. The PSTN guiding path offers a voiceband path for harmonic services that cannot properly support voice or a user to user control path.
  e. Existing call charging methods, billing methods and traffic statistic measurements can be used with little modification.

The upper part of FIG. 2 shows a PSTN with a Local-Trunk-Trunk-Local arrangement and with concentrators attached to the local exchanges. The signalling and switching are shown as separate layers. Ordinary subscribers without harmonic connections can make nonharmonic calls which are originated, terminated and connected solely within the PSTN. There are direct trunk to trunk connections shown by the dotted lines for longer distance calls.

Accessing a second network from the first network is already a standard telecommunication technique and can be instigated by subscriber signalling (dialling).

Apart from the row of harmonic switches, at the bottom of FIG. 2, the type of arrangement is already widely used, although not always with CLI being made available. The break out to the second network, could be from a local rather than from a trunk exchange as shown in FIG. 2 and neither network has to have the numbers of stages shown.

CLI is now a standard feature of interworking trunk signalling protocols and is already used for certain network interworking functions. The use of CLI simplifies the application of harmonic switching.

A harmonic subscriber is connected to the harmonic network via the harmonic access points. The harmonic access points are circuit connections only and contain no signalling means. The harmonic subscriber is also connected to the PSTN in a standard manner via a guiding narrowband connection which does contain signalling and supervisory means. Herein the guiding narrowband connection may also be referred to as the voiceband part of the call.

When the harmonic subscriber dials a suitable break out code, the voiceband part of the call will be routed via the voiceband part of the harmonic network.

Because CLI will be supplied to the harmonic network, the harmonic network can accurately associate the signalling and voiceband part of the call with the correct port on the first harmonic switch of the harmonic network.

Whilst within the harmonic network, the association of the voiceband part and the harmonic part of a call must be directly associated. Several techniques may be used to provide the necessary association including data tables to link the guiding circuit to the harmonic circuit. A harmonic route set method is described later which provides a very closely coupled linking arrangement for one type of harmonic service. It is important to ensure that the signalling for the voiceband part can be directly used as the signalling for the harmonic part, without the need for any more signalling messages or new types of signalling message.

Once the last harmonic switch is reached, the voiceband part is sent back into the PSTN for termination by the PSTN guiding access port of the terminating harmonic subscriber. As soon as answer is received in the normal way from the PSTN guiding termination, the harmonic part of the call can be connected to the terminating harmonic access point.

Figure 3:
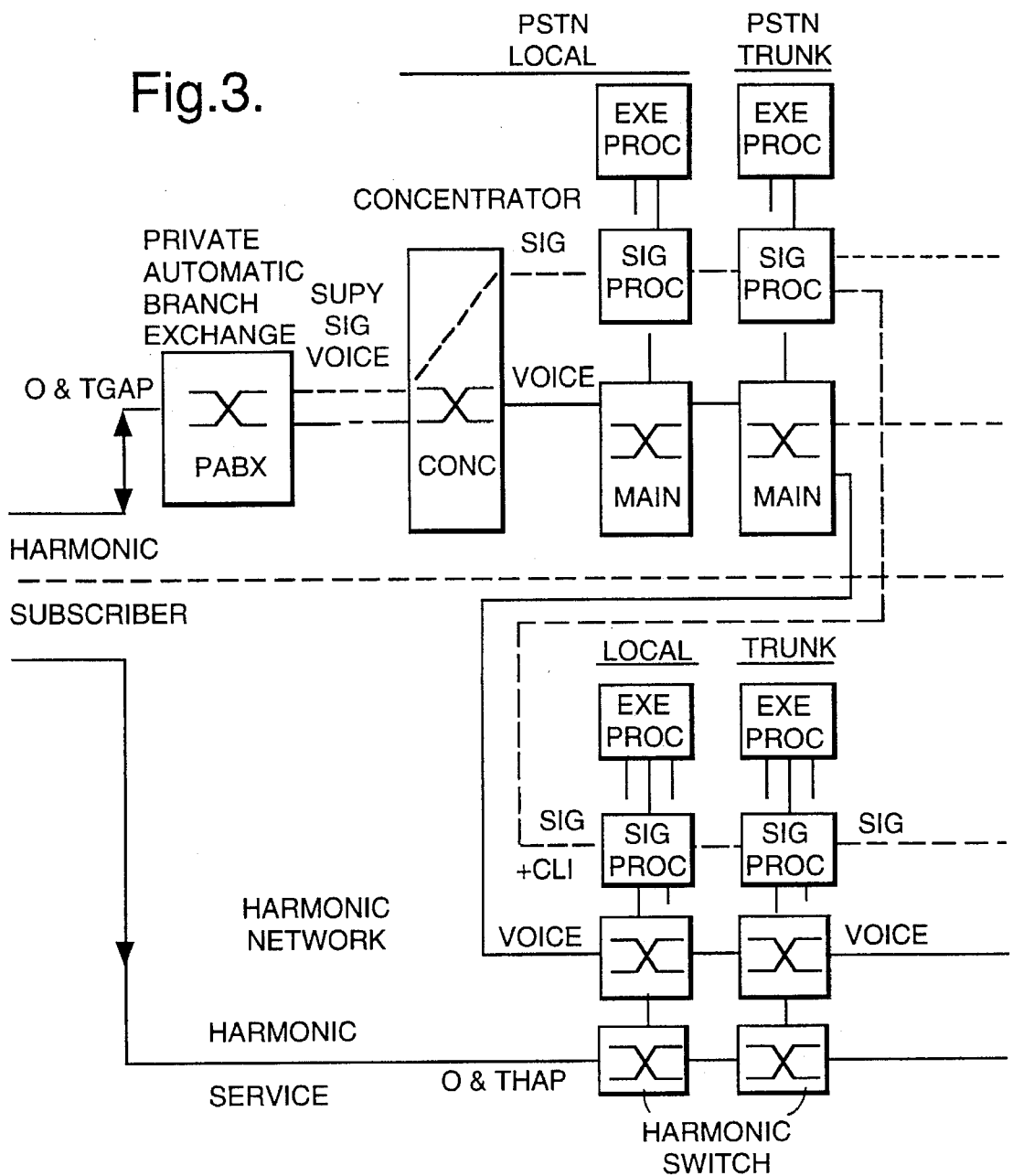
FIG. 3 shows a diagrammatic representation of a Private Automatic Branch exchange (PABX) connected to a multiple exchange PSTN with an interconnected multiple exchange harmonic network.

FIG. 3 is functionally the same as FIG. 2 except that a Private Automatic Branch Exchange (PABX) has been included. The Originating and or Termination Guiding Access Points are handled by a PABX instead of a PSTN local exchange. Provided a means of providing CLI is still available, a guiding access point may be associated with a PABX rather than a local PSTN exchange.

Figure 4:
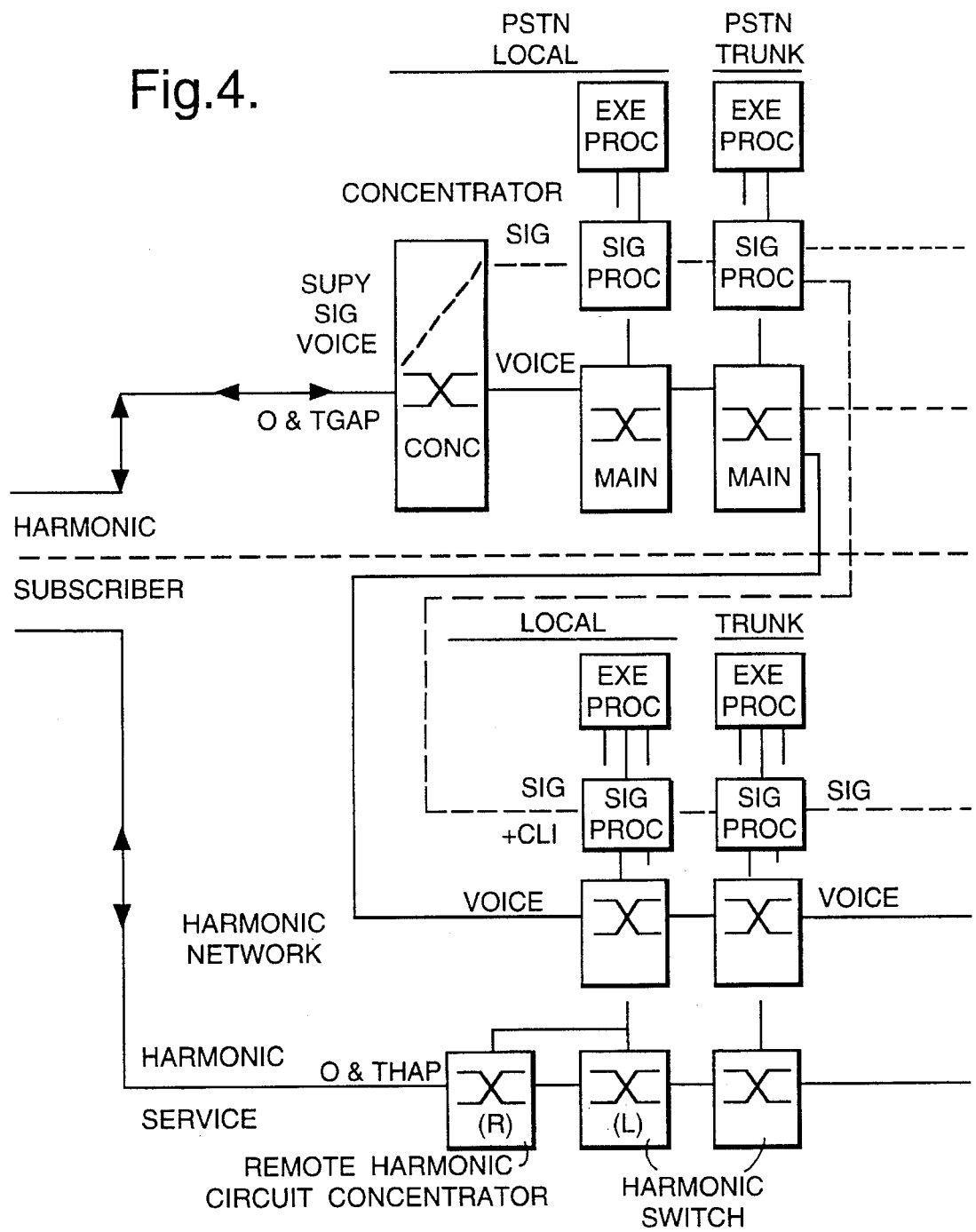
FIG. 4 shows a diagrammatic representation of a multiple exchange PSTN network with an interconnected multiple exchange harmonic network including a harmonic circuit concentrator which may be located remotely.

FIG. 4 is functionally the same as FIG. 2 except that a harmonic exchange has a distributed switching function. This is similar to the use within the PSTN of concentrators as shown in FIGS. 2, 3 and 4. A considerable function of a PSTN concentrator is to handle the subscriber signalling. A Harmonic Circuit Concentrator is provided for circuit concentration.

An example of the application of a Harmonic Circuit Concentrator is when a Harmonic Circuit Concentrator is situated on the same site as a PABX, in which case both the guiding and harmonic access points can be on the subscriber's premises. Such an application enables several harmonic access points to be offered without the need for each harmonic access point to have a dedicated connection back to the harmonic exchange.

An ATM statistical multiplexor/demultiplexor is an example of a device that can perform the function of a harmonic circuit concentrator. One method of operation of an ATM statistical multiplexor/demultiplexor is to have all the possible virtual circuits permanently enabled through to the ATM harmonic switch (L) in FIG. 4, but this can lead to considerable overloading if the tributary ports to the remote ATM harmonic circuit concentrator (R), supply too much traffic. However by using the harmonic control arrangements already described, if the total bandwidth requirement for the virtual circuits already in use has reached the maximum permitted limit, it is possible to refuse the guiding part of the circuit request and in so doing reject the request for the ATM circuit.

An example of how a guiding path can be directly related to a harmonic path is the harmonic route set method that is used for associating a 64 kbit/s guiding path with a 2 Mbit/s wideband harmonic path.

A complete harmonic route set of 2 Mbit/s contains 31 primary rate multiplexes of 2048 kbit/s. One of which, the guiding 2 Mbit/s link carries the 30 voiceband channels of 64 kbit/s. The other 30 links of 2 Mbit/s are each associated with a different one of the 30 guiding channels. The signalling can be carded in the time slot 16 of the guiding 2 Mbit/s link. If the guiding 2 Mbit/s link is link 16 then a simple relationship can be employed:

time slot 01 can be associated with link 01 time slot 02 can be associated with link 02 etc.

time slot 15 can be associated with link 15 time slot 17 can be associated with link 17 etc.

time slot 17 can be associated with link 17 etc.

time slot 31 can be associated with link 31

A partial harmonic route set of 2 Mbit/s would contain the guiding 2 Mbit/s link and as many harmonic links of 2 Mbit/s as required.

Appropriate harmonic routes sets can be employed for other harmonic service rates in order to avoid extra signalling and call processing complexity of handling 2 channel designations per call on each link between harmonic exchanges.

What we claim is:

1. A telecommunications switching system having a guiding transmission path and a harmonic transmission path, comprising:

a first exchange switching node containing an originating guiding access point on an exchange where an originating subscriber's guiding transmission path terminal is connected, the originating subscriber's guiding terminal having both supervisory and signaling means;

a second exchange switching node containing an originating harmonic access point on an exchange where an originating subscriber's harmonic transmission path terminal is connected;

a third exchange switching node containing a terminating guiding access point on an exchange where a terminating subscriber's guiding transmission path terminal is connected, the terminating subscriber's guiding terminal having both supervisory and signaling means;

a fourth exchange switching node containing a terminating harmonic access point on an exchange where a terminating subscriber's harmonic transmission path terminal is connected;

harmonic call switching means for establishing a harmonic call between the exchange having the originating harmonic access point and the exchange having the terminating harmonic access point; and guiding call means for establishing a guiding call between the guiding access points and passing through the exchanges having the originating and terminating harmonic access points.

2. The telecommunications switching system as claimed in claim 1, further comprising means for switching the guiding call, in addition to being switched through the first, second, third and fourth exchange switching nodes, through other exchange switching nodes by a guiding switch controlled by an exchange processor in response to signaling information associated with the guiding call and collected by an exchange signaling processor, one or more of the exchange switching nodes having a further switch controlled by its exchange processor, the further switch being operative for switching the harmonic transmission path associated with the guiding call.

3. The telecommunications switching system as claimed in claim 1, further comprising further harmonic transmission paths in parallel with said harmonic transmission path and being of different rates and types, said further harmonic transmission paths having their own originating and terminating harmonic access points, and wherein the guiding call means is operative for passing the guiding call through all the exchange switching nodes having originating and terminating harmonic access points of all the harmonic transmission paths associated with the guiding transmission path.

4. The telecommunications switching system as claimed in claim 3, further comprising means for making multimedia connections by using parallel harmonic transmission paths, the multimedia connections being established and cleared using the guiding transmission path.

5. The telecommunications switching system as claimed in claim 4, wherein an Asynchronous Transfer Mode multiplexer or a statistical multiplexer forms a remote harmonic circuit concentrator.

6. The telecommunications switching system as claimed in claim 1, wherein the harmonic transmission paths between the exchange switching nodes containing the further switches contain harmonic route sets, said sets having a fixed relationship between the guiding transmission path and an associated harmonic transmission path.

7. The telecommunications switching system as claimed in claim 1, further comprising means for not establishing the guiding transmission path of the guiding call between the exchange switching nodes of the originating harmonic access point and the terminating harmonic access point.

8. The telecommunications switching system as claimed in claim 7, further comprising means for providing managed private connections over the harmonic transmission paths by connecting the originating guiding access point and the terminating guiding access point of the associated guiding path to a private circuit management control function instead of connecting to the originating subscriber's guiding terminal and the terminating subscriber's guiding terminal.

9. The telecommunications switching system as claimed in claim 1, wherein the guiding call means is operative for starting the guiding call and the guiding transmission path at an exchange switching node not having a further switch and having the originating guiding access point of the guiding call, for traversing a network of the exchange switching nodes not containing said further switches, for breaking out and entering a network of exchange switching nodes containing said further switches at the exchange switching node that has the originating harmonic access point associated with the guiding call, for traversing with the harmonic transmission path across said network until reaching the exchange switching node that has the terminating harmonic access point associated with the guiding call, whereupon the guiding call and the guiding transmission path breaks out and enters the network of exchange switching nodes not containing said further switches, and traverses to the exchange switching node which has the terminating guiding access point of the guiding call.

10. The telecommunications switching system as claimed in claim 9, wherein the exchange switching nodes not containing said further switches are Private Automatic Branch Exchanges.

11. The telecommunications switching system as claimed in claim 9, wherein the guiding call means is operative for traversing the guiding call and the associated guiding transmission path over the network with exchange switching nodes not containing said further switches, said network being a Public Switched Telecommunications Network having a voiceband and/or a 64 kbit/s circuit.

12. The telecommunications switching system as claimed in claim 2, wherein each path is wideband.

13. The telecommunications switching system as claimed in claim 2, whereto each path is broadband.

14. The telecommunications switching system as claimed in claim 2, wherein each path is primary rate, 2048 kbit/s or 1544 kbit/s.

15. The telecommunications switching system as claimed in claim 2, wherein each path is n×primary rate.

16. The telecommunications switching system as claimed in claim 2, whereto each path is n×64 kbit/s.

17. The telecommunications switching system as claimed in claim 2, whereto each path is Asynchronous Transfer Mode.

* * * * *